United States Patent [19]
Gellert et al.

[11] Patent Number: 5,030,084
[45] Date of Patent: Jul. 9, 1991

[54] PRE-WIRED INJECTION MOLDING ASSEMBLY

[75] Inventors: Jobst U. Gellert, Georgetown; Steven K. Fox, Brampton, both of Canada

[73] Assignee: Mold-Masters Limited, Ontario, Canada

[21] Appl. No.: 576,857

[22] Filed: Sep. 4, 1990

[51] Int. Cl.[5] ............................................. B29C 45/22
[52] U.S. Cl. .................... 425/549; 219/421; 264/328.15; 361/428; 425/570
[58] Field of Search ............... 425/547, 549, 567, 569, 425/570; 361/428; 219/421; 264/328.14, 328.15

[56] References Cited

U.S. PATENT DOCUMENTS

| | | | |
|---|---|---|---|
| 3,520,026 | 7/1970 | Stidham et al. | 425/547 |
| 4,468,191 | 8/1984 | Gellert | 264/328.15 |
| 4,729,733 | 3/1988 | Schmidt | 425/549 |
| 4,866,575 | 9/1989 | Mickelson et al. | 361/428 |
| 4,911,662 | 3/1990 | Debortoli et al. | 361/428 |

*Primary Examiner*—Timothy Heitbrink
*Attorney, Agent, or Firm*—Dalesman & Company

[57] ABSTRACT

A pre-wired injection molding assembly to be supplied to the customer for installation in a mold. The assembly includes a number of sub-manifolds connected to a main manifold, a wiring frame having a number of elongated fingers connected to the sub-manifolds, and a number of heated nozzles connected to the sub-manifolds. The fingers of the wiring frame extend from a hollow channel member which leads to a connector box. The assembly is pre-wired by the supplier by running the wires from the nozzles along the fingers and through the channel member to the connector box. The pre-wired assembly is mounted from the rear in a matching mold manifold plate which greatly facilitates installation and disassembly for the customer.

6 Claims, 5 Drawing Sheets

PRE-WIRED INJECTION MOLDING ASSEMBLY

BACKGROUND OF THE INVENTION

This invention relates generally to injection molding and more particular to a pre-wired assembly which greatly facilitates installation of multi-cavity injection molding systems.

Injection molding systems are generally assembled by a molder or moldmaker who makes the mold, including the manifold plate, and installs the manifold and nozzles in it. With the trend toward larger and larger multi-cavity systems, considerable care and precession is required on both the parts of the supplier and the customer If the completed system does not function properly, this division in responsibility can lead to difficulties between them. This has particularly been a problem in regard to the customer wiring systems, with which they are not familiar. Each of the nozzles has a heater wire and usually a thermocouple wire, and therefore wiring large multi-cavity systems can take several days. Furthermore, many existing wired in place systems have manifolds and nozzles installed from one side of a mold manifold plate, with heated components and wiring installed from the opposite side. In addition to the above installation problems, this also makes disassembly and replacement much more difficult.

SUMMARY OF THE INVENTION

Accordingly, it is an object of the present invention to at least partially overcome the problems of the prior art by providing an assembly of a manifold, nozzles and a wiring frame which is pre-wired and can be supplied either with or without a mold manifold plate.

To this end, in one if its aspects, the invention provides a pre-wired injection molding assembly comprising a manifold having a melt passage extending therethrough from a common inlet to a plurality of spaced outlets, a plurality of heated nozzles, each nozzle having a rear end and melt bore extending therethrough from an inlet at the rear end, each nozzle having electrical wires extending therefrom and being mounted to the manifold with the melt bore inlet in alignment with one of the melt passage outlets, and a wiring frame extending from at least one connector box, the wiring frame having a plurality of elongated fingers extending from a channel member which leads to the connector box, each of the fingers extending adjcent at least one of the nozzles whereby the wires from each nozzle run along one of the fingers and through the channel member to the connector box.

Further objects and advantages of the invention will appear from the following description, taken together with the accompanying drawings.

DETAILED DESCRIPTION OF THE DRAWINGS

Figure 1:
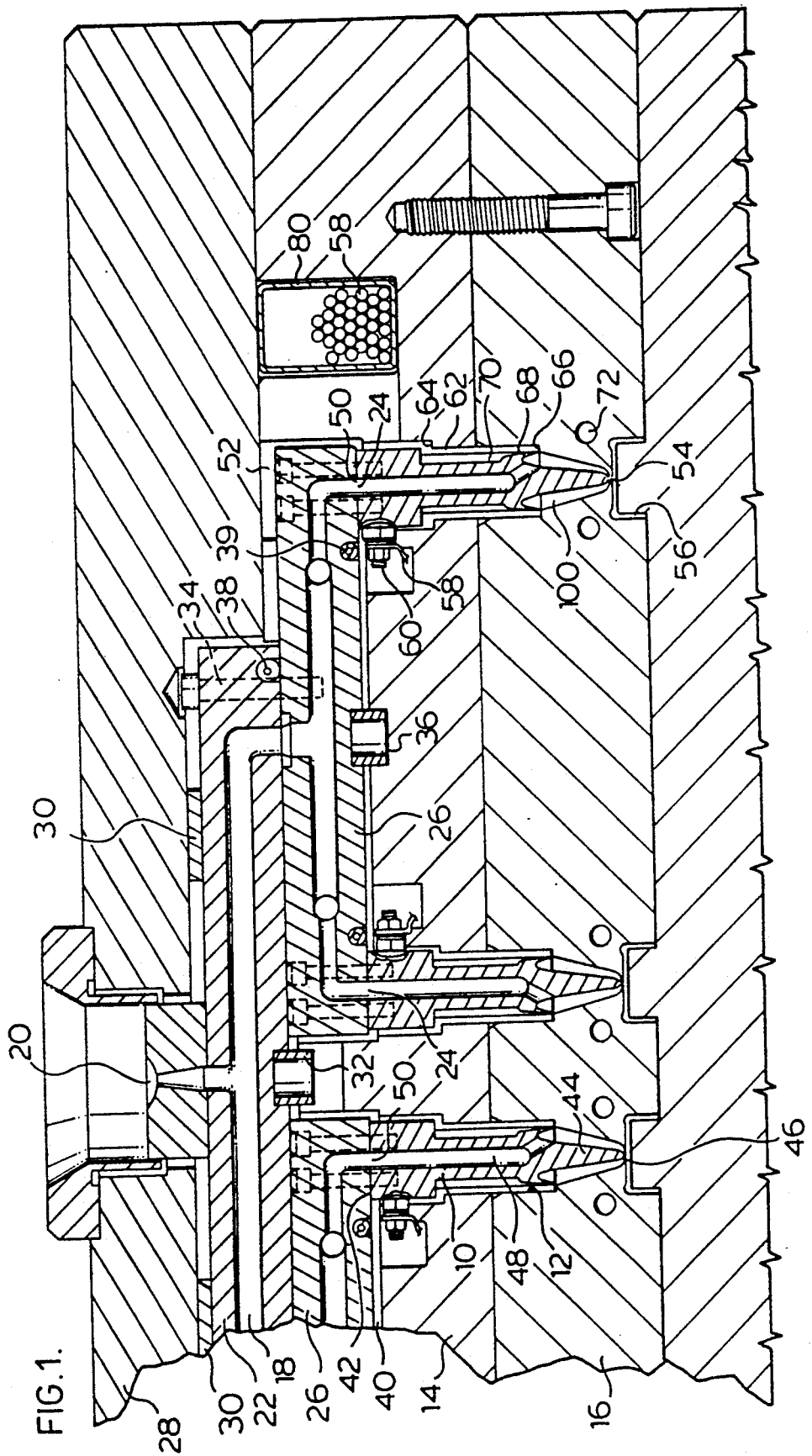
FIG. 1 is a partial sectional view of a portion of an injection molding system having an assembly according to a preferred embodiment of the invention.

Reference is first made to FIG. 1 which shows part of an injection molding system having a number of heated nozzles 10, each seated in a nozzle well 12 in a mold manifold plate 14 and a cavity plate 16. In this embodiment, the melt passage 18 branches from a common inlet 20 leading to a main manifold 22 to a number of spaced outlets 24 from a number of sub-manifolds 26. As can be seen, the main manifold 22 is accurately mounted between the clamp plate 28 and the sub-manifolds 26 by insulative pressure pads 30 and a central locating ring 32. The sub-manifolds 26 are secured to the main manifold 22 by bolts 34 and are, in turn, each accurately located by locating rings 36. The main manifold 22 is heated by an electrical heating element 38, and the sub-manifolds 26 are heated by an electrical heating element 39. The main manifold 22 and the sub-manifolds 26 are thermally separated from the surrounding clamp plate 28 and mold manifold plate 14 by insulative air space 40.

Each nozzle has a flat rear end 42 and a tapered nose portion 44 leading to a pointed tip 46 at the forward end. A melt bore 48 extends through the nozzle 10 from an inlet 50 at the rear end 42. The nozzle 10 is secured by bolts 52 to one of the sub-manifolds 26 with the inlet 50 in alignment with one of the outlets 24. The pointed tip 46 is in alignment with a gate 54 extending through the cavity plate 16 to a cavity 56. Each nozzle 10 has an integral electrical heating element (not shown) with a lead wire 58 connected to its terminal 60. In this embodiment, the nozzle 10 is located in the nozzle well 12 by a threaded sleeve 62 which is screwed onto it, and abuts against circumferential shoulders 64,66. A sealing and locating flange 68 extends across an insulative air space 70 into contact with the sleeve 62. The cavity plate 16 is cooled by pumping cooling water through cooling conduits 72 adjacent the gate 54.

Figure 2:
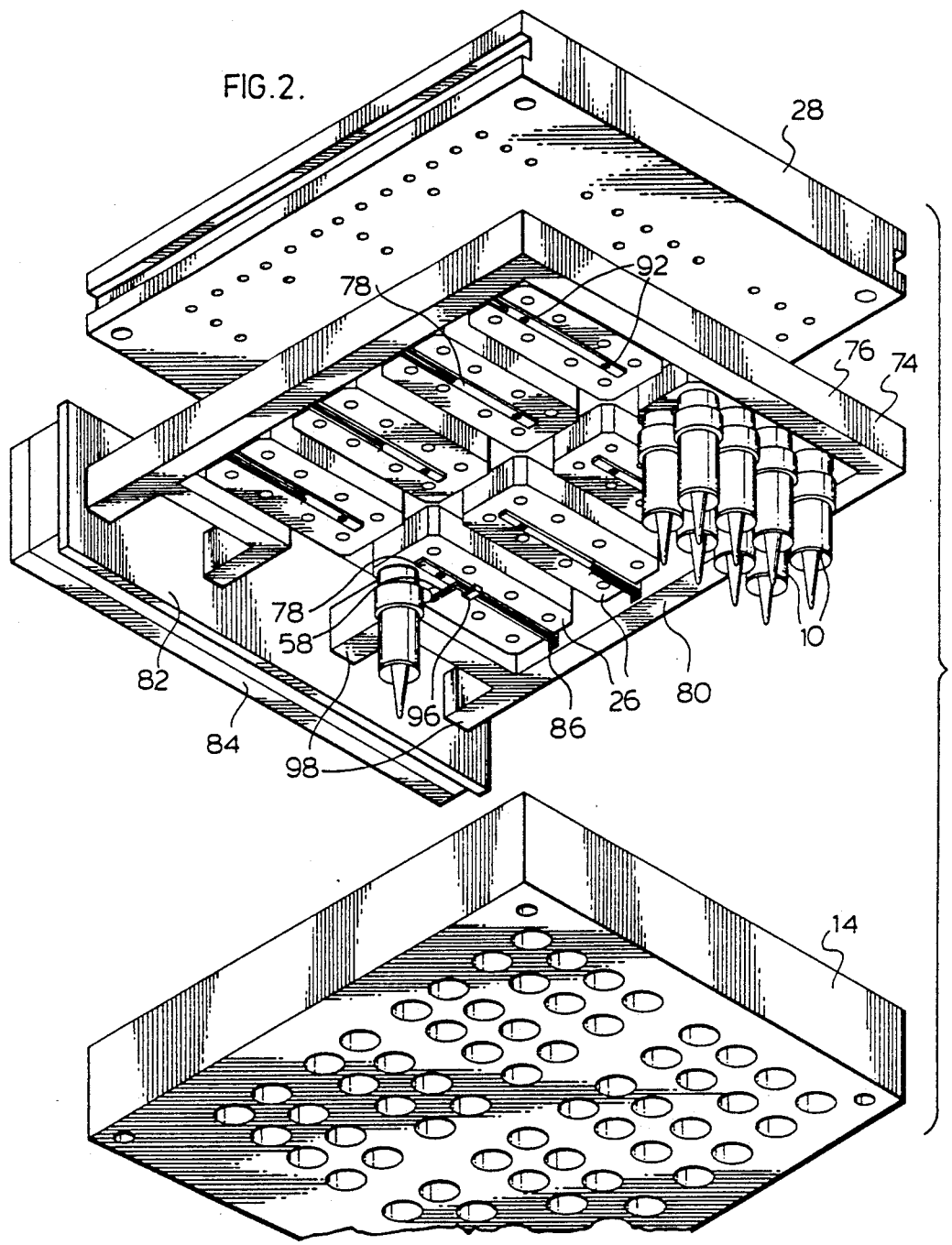
FIG. 2 is an isometric view showing how the assembly is secured between the clamp plate and the mold manifold plate.
Figure 4:
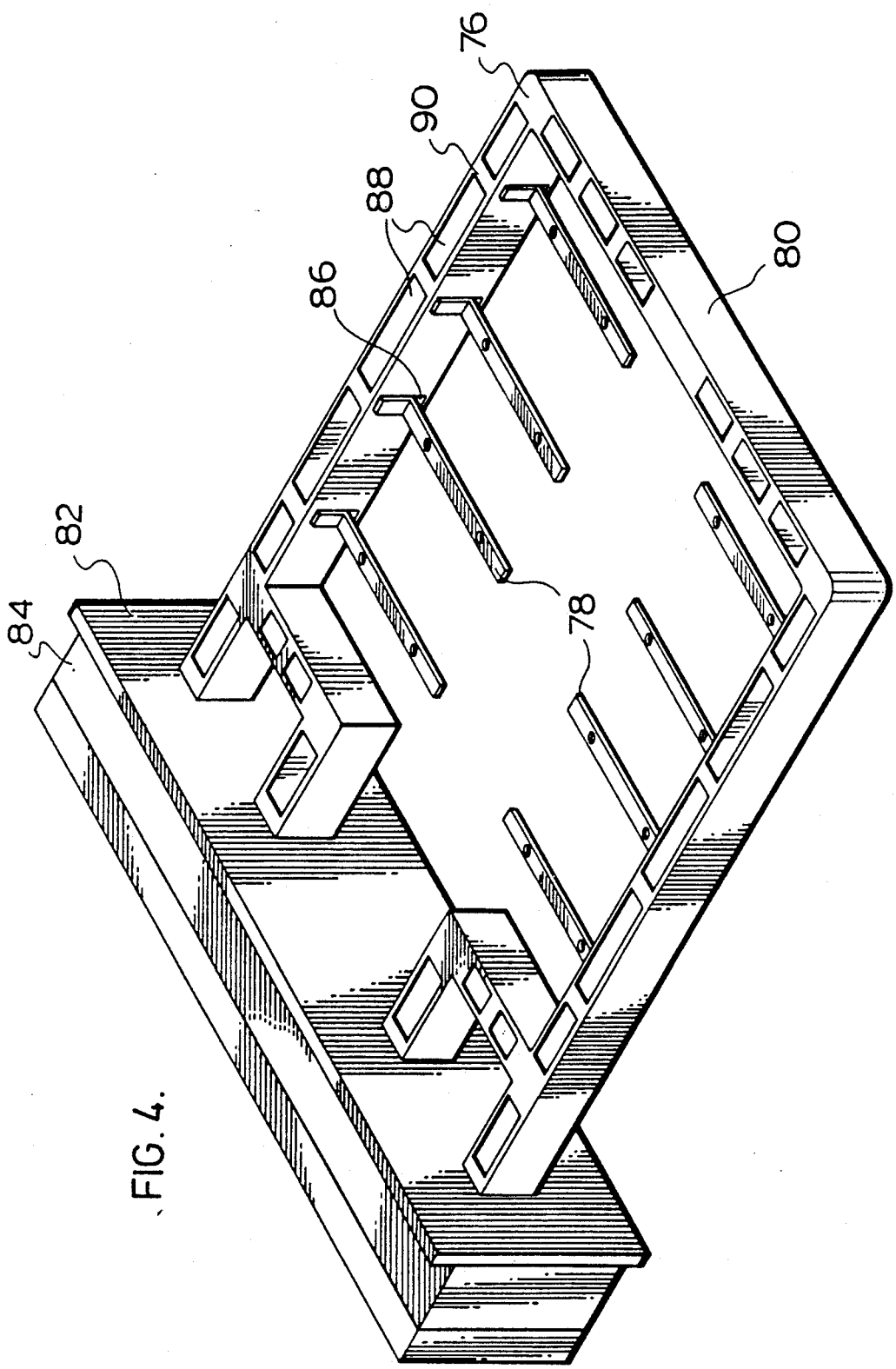
FIG. 4 is an isometric view of the wiring frame.

Reference is now made to FIG. 2 which shows a pre-wired assembly 74 according to a preferred embodiment of the invention and how it is installed between the clamp plate 28 and mold manifold plate 14. The assembly 74 includes a wiring frame 76, a number of sub-manifolds 26 which are connected to a main manifold 22 (FIG. 1), and numerous nozzles 10, (only some of which are shown), each of which is connected to one of the sub-manifolds 26. As clearly seen in FIG. 4, the wiring frame 76 includes a number of elongated fingers 78 which extend inwardly in a parallel relationship from a generally U-shaped channel member 80. The channel member 80 is welded to a mounting plate 82 which forms part of an electrical connector box 84 which contains plugs (not shown) and other electrical apparatus necessary to make the required external electrical connections. While only one connector box 84 is shown in this system, larger systems could have multiple connector boxes. The channel member 80 is hollow with a generally rectangular cross section, and has an opening 86 adjacent each finger 78 to receive the wires 58 from the nozzles 10 therethrough. The channel member 80 also has other larger openings 88 through at least one side 90 to facilitate running the wires 58 during assembly.

Figure 3:
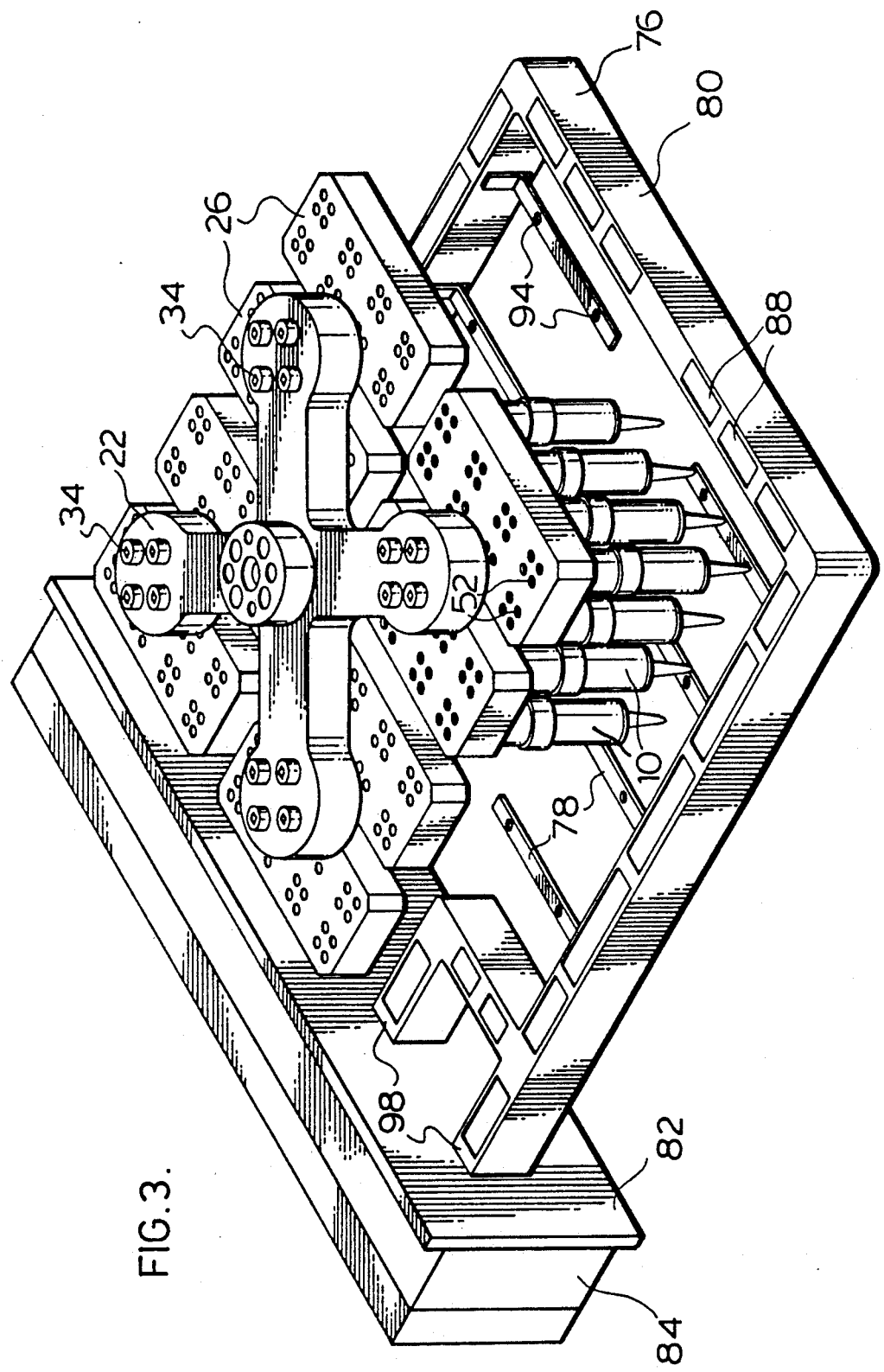
FIG. 3 is an exploded isometric view of the assembly.

Referring to FIGS. 2 and 3, the assembly 74 is assembled by the supplier by bolting the sub-manifolds 26 to the main manifold 22 as described above. The sub-manifolds 26 are then secured to the fingers 78 of the wiring frame 76 by screws 92 which extend through holes 94 into the sub-manifolds 26. Each nozzle 10 is then secured to one of the sub-manifolds 26 by bolts 52 and the lead wire 58 or wires is run along the adjacent finger 78, through the opening 86 into the hollow channel member 80. The wires 58 are fastened to the fingers 78 by clips 96. The numerous wires 58 from all of the nozzles 10 run through the channel member 80 into the connector box 84. In this embodiment, the channel member 80 branches into two parts 98 at each end adjacent the connector box 84 to facilitate routing the wires. However, wiring frames 76 having other configurations of fingers 78 and channel members 80 can also be used. As mentioned above, this assembly and wiring is provided completely by the supplier, which has the advantage that it is assembled and tested by people who are very familiar with how to do it and have the entire responsibility for any mistakes.

Figure 5:
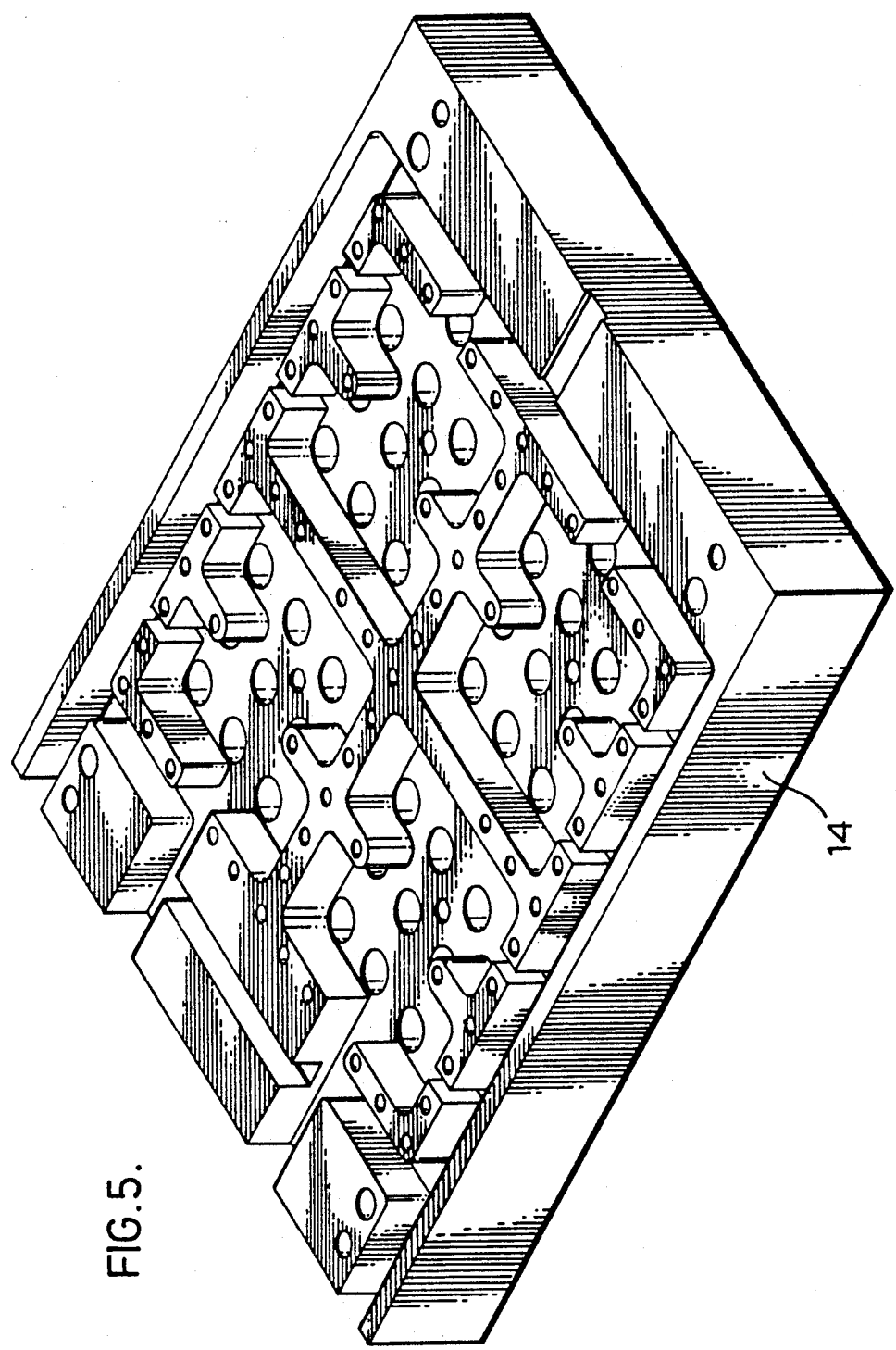
FIG. 5 is an isometric view of the mold manifold plate.

After the pre-wired assembly 74 shown in FIG. 2 is received by the customer, it is mounted in the mold manifold plate 14, which may be made by either the supplier or by the customer to the supplier's specifications. As can be seen particularly in FIG. 5, the mold manifold plate 14 is machined to an exact configuration to receive the assembly 74, while retaining the maximum structural strength necessary to withstand the molding forces. As can be seen, the assembly 74 is mounted in the mold manifold plate 14 entirely from the rear which considerably facilitates both installation and disassembly, when it is necessary.

In use, after the injection molding system has been assembled as shown in FIG. 1, electrical power is applied to heat the nozzles 10, main manifold 22 and sub-manifolds 26 to a predetermined operating temperature. Pressurized melt from a molding machine (not shown) is then injected into the melt passage 18 through the inlet 20 according to a predetermined cycle in a conventional manner. The pressurized melt flows through the melt passage in the elongated main manifold 22 and in each sub-manifold 26, through the central melt bore 48 of each nozzle 10 into a space 100 surrounding the nose portion 44, and then through the gate 54 to fill the cavity 56. The space 100 remains filled with melt, a portion of which solidifies adjacent the cooled cavity plate 16, and the sealing and locating flange 68 prevents it escaping into the insulative air space 70. After the cavities 56 are filled, injection pressure is held momentarily to pack and then released. After a short cooling period, the mold is opened to eject the molded products. After ejection, the mold is closed and injection pressure is reapplied to refill the cavities. This cycle is continuously repeated with a frequency dependent on the size and shape of the cavities and the type of material being molded.

While the description of the pre-wired assembly 74 has been given with respect to a preferred embodiment, it is not to be construed in a limiting sense. Variations and modifications will occur to those skilled in the art. For instance, it is apparent that a variety of different configurations and/or numbers of sub-manifolds 26 and main manifold 22 (or only a main manifold) can be used. This would require a wiring frame 76 having a different arrangement of fingers 78 and/or channel members 80. Of course, the nozzles 10 may be of different types, and each nozzle may have a thermocouple and/or have a two wire heater which greatly increases the wiring requirement. Reference is made to the appended claims for a definition of the invention.

What we claim is:

1. A pre-wired injection molding assembly comprising:
   (a) a manifold having a melt passage extending therethrough from a common inlet to a plurality of spaced outlets;
   (b) a plurality of heated nozzles, each nozzle having a rear end and melt bore extending therethrough from an inlet at the rear end, each nozzle having electrical wires extending therefrom and being mounted to the manifold with the melt bore inlet in alignment with one of the melt passage outlets, and
   (c) a wiring frame extending from at least one connector box, the wiring frame having a plurality of elongated fingers extending from a channel member, said channel member leading to the connector box, each of the fingers extending adjacent at least one of the nozzles whereby the wires from each nozzle run along one of the fingers and through the channel member to the connector box.

2. An injection molding assembly as claimed in claim 1 wherein the fingers are secured to the manifold.

3. An injection molding assembly as claimed in claim 1 wherein the manifold includes a plurality of sub-manifolds connected to a main manifold, and the common inlet to the melt passage is on the main manifold and the spaced outlets of the melt passage is on the sub-manifolds.

4. An injection molding assembly as claimed in claim 3 wherein each of the fingers is secured to a corresponding sub-manifold.

5. An injection molding assembly as claimed in claim 4 wherein the channel member of the wiring frame is hollow and has a generally rectangular cross-section with an opening adjacent each finger to receive the wires therethrough.

6. An injection molding assembly as claimed in claim 4 wherein the channel member of the wiring frame extends from the connector box with a generally U-shaped configuration, and the fingers extend inwardly from the channel member in a generally parallel relationship to each other.

* * * * *